Sept. 17, 1940.  W. RABKIN  2,215,230
SUPPLY CONTAINER FOR PHOTOGRAPHIC PLATES FOR
AUTOMATIC PHOTOGRAPHIC MACHINES
Filed Oct. 7, 1939  4 Sheets-Sheet 1
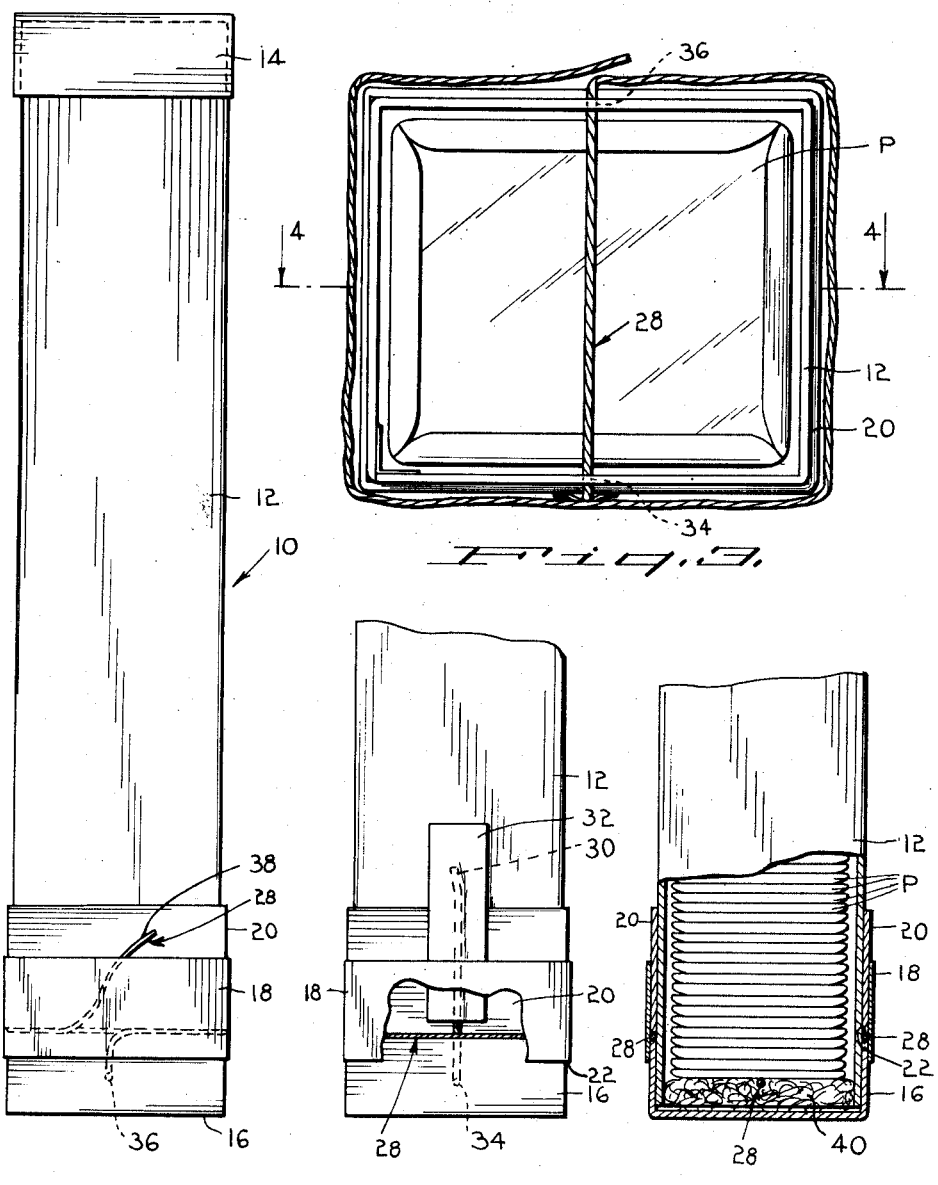
INVENTOR.
WILLIAM RABKIN
BY
ATTORNEY.

Sept. 17, 1940.           W. RABKIN           2,215,230
SUPPLY CONTAINER FOR PHOTOGRAPHIC PLATES FOR
AUTOMATIC PHOTOGRAPHIC MACHINES
Filed Oct. 7, 1939           4 Sheets-Sheet 2
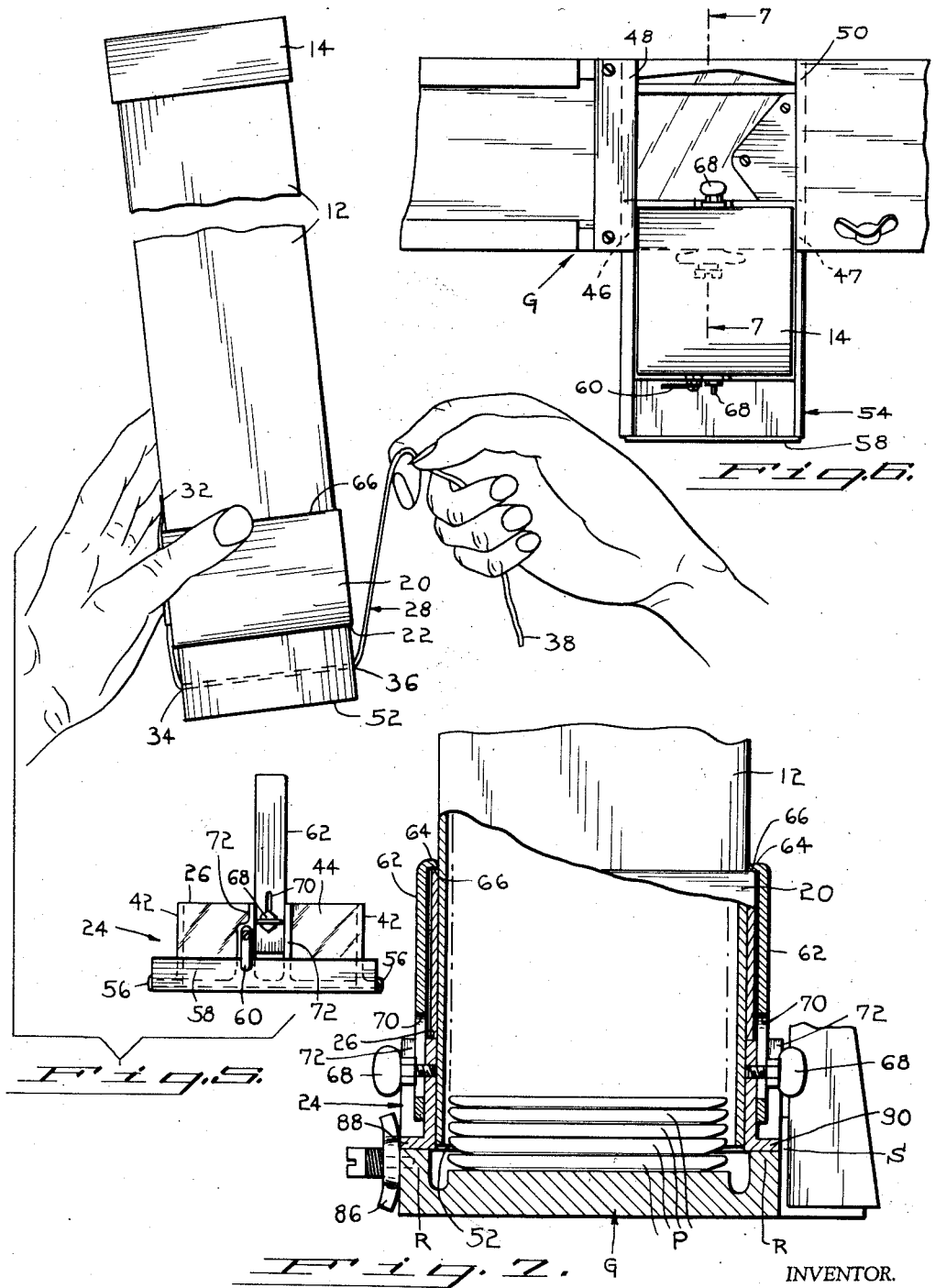
INVENTOR.
WILLIAM RABKIN
BY
ATTORNEY.

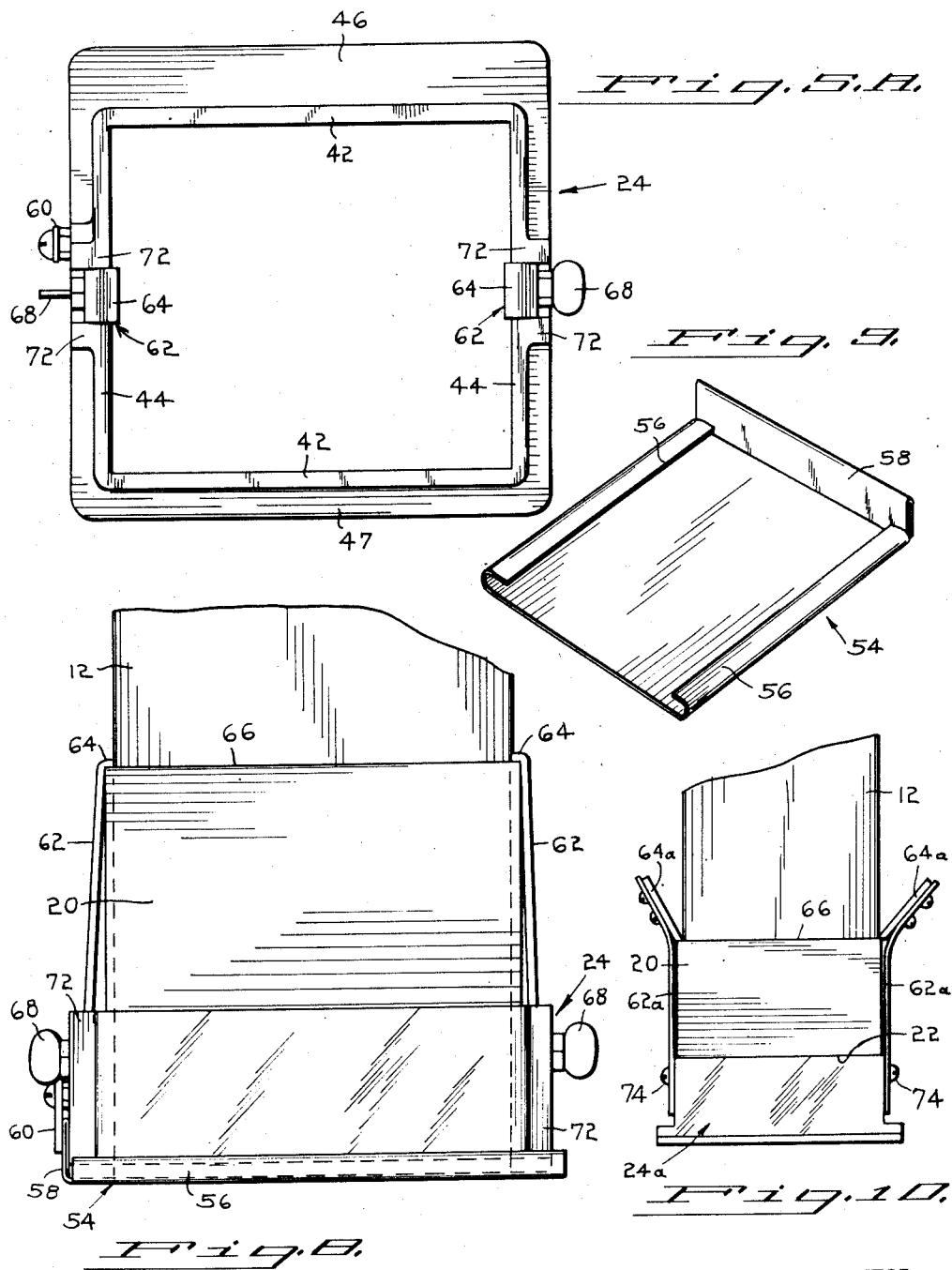

Sept. 17, 1940.  W. RABKIN  2,215,230
SUPPLY CONTAINER FOR PHOTOGRAPHIC PLATES FOR
AUTOMATIC PHOTOGRAPHIC MACHINES
Filed Oct. 7, 1939  4 Sheets-Sheet 4

INVENTOR.
WILLIAM RABKIN
BY
ATTORNEY.

Patented Sept. 17, 1940

2,215,230

UNITED STATES PATENT OFFICE 2,215,230

SUPPLY CONTAINER FOR PHOTOGRAPHIC PLATES FOR AUTOMATIC PHOTOGRAPHIC MACHINES

William Rabkin, New York, N. Y.

Application October 7, 1939, Serial No. 298,373

20 Claims. (Cl. 95—19)

This invention relates to supply containers for photographic plates for use in automatic photographic machines.

Automatic photographic machines of the type for which the supply containers of the present invention are intended have heretofore been provided with a metal container or magazine mounted on a guide-way in vertical position and containing a stack of frame photographic or light-sensitive plates arranged so that a pusher member provided in the machine can engage the lowermost plate in said metal container for ejecting said plate from the container and for moving the same to a camera where the plate is exposed. A photographic machine of this type is provided with such metal supply container for the photographic plates as shown in Patent No. 2,192,755, granted March 5, 1940, to me and Leo Einar Larsen.

Heretofore in the operation of automatic photographic machines of the type referred to it was necessary in replenishing the supply of photographic plates in the machine to transfer said plates from the containers in which they are shipped to the separate supply container or magazine of the photographic machine. This transfer of the plates for reloading the supply container is objectionable because of the necessity or desirability of reloading the supply container in a "dark room" in order to avoid exposure of the plates to light. One of the objects of the present invention therefore is to obviate this objection.

Another object of the invention is to provide a package or shipping container of photographic plates which can be used in the photographic machine as the supply container or magazine.

A further object of the invention is to provide a package or container of photographic plates which can be quickly and conveniently mounted in the photographic machine without danger of exposing the plates to light.

A further object of the invention is to provide a package or container of photographic plates which container is light-proof and fully sealed against the passage of light, thereby to protect the photographic plates therein, and which is provided with means to facilitate the opening of the container in such manner as to prevent access of light to the photographic plates in the container when the latter is opened.

The above objects of the invention and other objects ancillary thereto will best be understood from the following description considered with reference to the accompanying drawings.

In the drawings:

Fig. 1 is a side view of a package of photographic plates embodying the present invention;

Fig. 2 is a fragmentary side view of the package at the side opposite that shown in Fig. 1;

Fig. 3 is a bottom end view of the package with the bottom end closure removed;

Fig. 4 is a sectional view on the line 4—4 of Fig. 3;

Fig. 5 is a side view of the package and base and illustrates the manner of associating the package with the base for forming the supply container or magazine;

Fig. 5a is a top plan view of the base of the magazine;

Fig. 6 is a fragmentary top plan view of the guide-way of the photographic machine and illustrates the method of mounting the supply container in position on said guide-way;

Fig. 7 is a sectional view on the line 7—7 of Fig. 6, the supply container being in proper position on the guide-way;

Fig. 8 is a fragmentary side view of the supply container including the base and a temporary cover for the latter;

Fig. 9 is a perspective view of the temporary cover;

Fig. 10 is a view similar to Fig. 8 showing another form of the invention;

Figure 12:
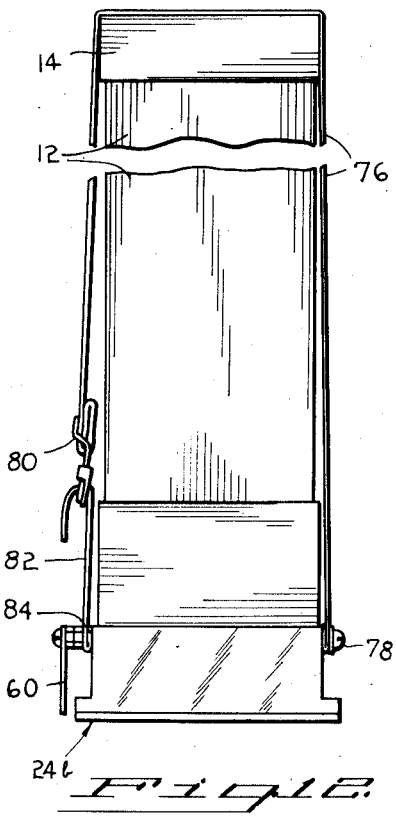
Fig. 12 is a side view of the container shown in Fig. 11.

Referring now to the drawings in detail the package 10 of photographic plates in the condition in which it is shipped to its destination for use is illustrated in Fig. 1. Said package is light-proof and comprises a container of any suitable inexpensive opaque material such as cardboard and consists of a tubular body portion 12 of oblong cross section in which the framed sensitized photographic plates P are mounted in stacked relation as illustrated in Fig. 4, with the sensitized surfaces of said plates uppermost. The inner configuration of tubular member 12 conforms substantially in size and shape to said framed photographic plates and is substantially filled with the latter from end to end. One end of tubular member 12, here shown as the top end, considering the container in vertical position as when it is mounted on the guide-way of the photographic machine, is sealed by an end closure or flanged cover 14 glued or otherwise fixedly secured to end portion of tubular member 12 to prevent the passage of light into the container. End closure member 14 is intended to be non-removable. The other or lower end of the tubular member 12 is provided with an end closure member or cover 16 similar to cover 14 except that it is intended to be removed to permit the photographic plates to be successively ejected one at a time from the supply container or magazine as will hereinafter appear.

Closure member 16 is fastened to tubular member 12 of the container in such manner that the removal of said closure member can be quickly and conveniently accomplished without exposing the photographic plates to light. For this purpose closure member 16 is secured to tubular member 12 by a strip 18 of opaque gummed paper which overlaps the side walls of said closure member completely therearound and which also overlaps the peripherally extending member 20. Said last mentioned member is fixedly secured to the outer surface of tubular member 12 completely therearound adjacent the lower end of said member to provide a peripherally continuous shoulder 22 which engages base member 24 at the upper edge 26 thereof when tubular member 12 is connected thereto as indicated in Figs. 5, 7 and 8. Shoulder forming member 20 is made of any suitable material such as cardboard and is secured to tubular member 12 preferably by an adhesive. Fastening strip 18 covers the portion of strip 20 and the side walls of closure member 16 at the abutting edges thereof as clearly illustrated in Figs. 1 to 4. A cord 28 is secured at one end 30 thereof to tubular member 12 by a strip 32 of gummed paper. Said cord extends downwardly beneath strip 32 and strip 18 and passes through an opening 34 in one side of tubular member 12, then across the container and through an opening 36 in the opposite side thereof, and then completely around the container on the outer surface beneath the fastening strip 18 to the side of the container provided with the opening 36. A free end portion 38 of cord 28 projects laterally beyond fastening strip 18 so that the cord can be gripped when it is desired to release the end closure member 16 which is accomplished by dividing said strip, by tearing the same by means of cord 28 completely therearound. When closure member 16 is thus released from its securement to the container it may be removed while the container is held in vertical position without danger of the photographic plates falling out of the container, since cord 28 is effective, as illustrated in Fig. 5 to hold said plates within the container preliminary to removing cover 16 and mounting the container on base 24. By reference to Fig. 4 it will be observed that filling material such as tissue paper 40 is disposed between the lowermost plate P and the end closure member 16. This filling material holds the plates against movement thereof within the container during shipment and in addition prevents the access of light to the container when the closure member 16 is removed. It will be understood that this filling material is removed at the time the container is connected to base 24 and that after said container is connected to the base, cord 28 is removed by detaching its end 30 and strip 32 and drawing the cord through openings 36 and 34 to completely separate the cord from the container and from base 24.

Figure 13:
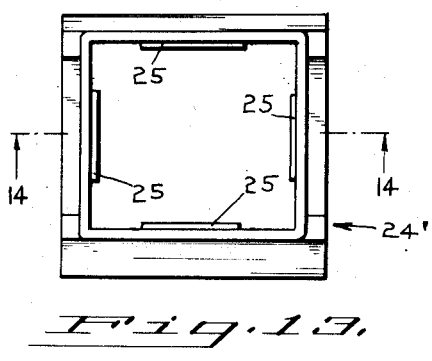
Fig. 13 is a top plan view of a magazine base, illustrating a modification.

Base 24 is preferably a metal casting comprising opposite side walls 42 and opposite side walls 44 defining a rectangular tubular portion in which the lower end portion of the container 12 has a snug fit as illustrated in Fig. 7. As hereinbefore stated the container is supported on the upper edge 26 of base 24 by the shoulder 22 formed on member 20. It will be understood, however, that the container may be otherwise supported on the base 24. For example, as illustrated in Fig. 13, the base 24' is provided with side ledges 25 on which the lower side edges of the container rest for supporting the container. With this form of base, member 20 can be omitted or can be used, as hereinafter described, for engagement at its upper edge by means for releasably securing the container to the base. The side walls 42 of base 24 are provided with flanges 46 and 47 which are slid under the lateral side rail portions 48 and 50 of the guideway G as illustrated in Fig. 6, whereby the base is properly secured and positioned on said guide-way. The lower edge 52 of tubular member 12 of the container terminates at or adjacent the lower surface of base 24, preferably just above said lower surface. For temporarily closing the lower end of base 24, when the container is connected thereto and before mounting base 24 and the attached container on guide-way G, there is utilized a temporary closure member 54 having inturned side edge portions 56 which fit over the side flanges 46 and 47 of the base. Member 54 is also provided with an upwardly extending end flange 58 which limits the movement of member 54 on the base in one direction. Flange 58 is engaged by a latch 60 pivoted on side wall 44 of base 24 for holding member 54 in position over the bottom of base 24. By reference to Fig. 6 it will be observed that as the base 24 and the attached container is being mounted on guide-way G of the photographic machine, the temporary closure member 54 is progressively moved off of the base 24 and it will be understood that said temporary closure 54 is entirely removed from base 24 when the latter is in its final position on guide-way G. When member 54 is removed the photographic plates are supported as illustrated in Fig. 7 with the lowermost plate in engagement with and supported by the side rails R of the guide-way G.

Provision is made for releasably connecting the container of photographic plates to base 24 whereby to prevent the accidental displacement of said container from the base. For this purpose base 24 is provided with retaining members here shown as metal straps 62 connected to the opposite sides 44 of base 24 and provided at their upper ends with inturned edge portion 64 which engage the upper shoulder 66 constituted by the upper edge of member 20. Retaining members 62 are adjustably connected to base 24 by screws 68 which pass through longitudinally extending slots 70 in members 62 and are threaded into the sides 44 of the base. Members 62 are guided for movement transversely of the shanks of screws 68 and are prevented from turning on said screw shanks by spaced ribs 72 projecting from sides 44 of the base. In the form of the invention illustrated in Fig. 10, the base 24a is substantially the same as the base 24 with the exception that the retaining members 62a are formed of spring metal strips and are provided at their upper ends with plates 64a which engage the upper shoulder-edge 66 of member 20. The lower ends of retaining members 62a are secured to the opposite side walls of base 24a in any suitable way as by screws 74.

Figure 11:
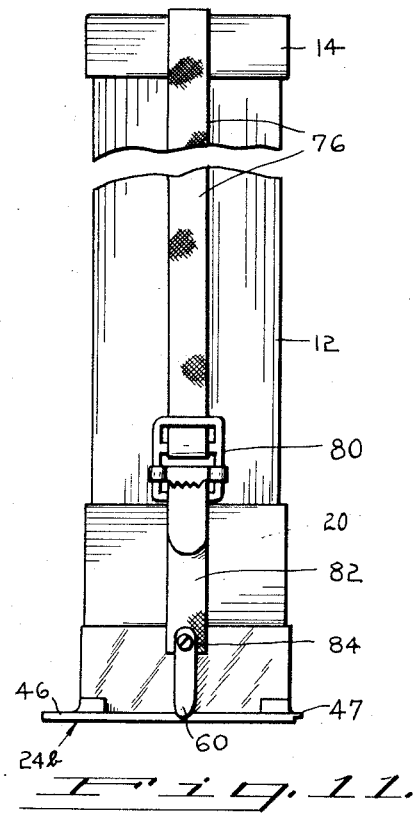
Fig. 11 is a side view of a supply container including a base and means in accordance with another form of the invention for securing the supply container to its base.
Figure 14:
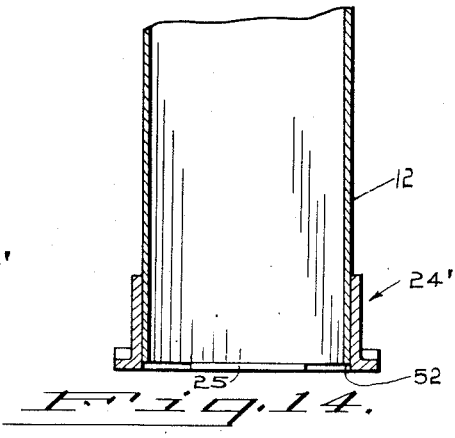
Fig. 14 is a sectional view on the line 14—14 of Fig. 13, the lower part of the container being shown in position.

In the form of the invention illustrated in Figs. 11 and 12, the base 24b which is substantially the same as the base 24 is provided with retaining means constituted by a flexible leather or fabric strap 76 secured at one end thereof in any suitable way as by a screw 78 to a side wall of the base and provided at its other end with a buckle 80 adapted to be releasably and adjustably engaged by strap portion 82 secured at one end 84 thereof to the opposite side of the base. The strap means here shown may be conveniently used for securing a container to the base when the container is devoid of a shoulder-forming member 20 and in particular with a base such as base 24' shown in Figs. 13 and 14 adapted for a container which is not provided with a shoulder member 20 or the like.

It will be observed by reference to Fig. 7, that after the base and the attached container of photographic plates are mounted as a unit on the guide G, the base is held releasably in fixed position on said guide by a pivoted latch 86 which engages the base at one side edge 88 thereof, the opposite side edge 90 of the base abutting against a part S at the rear of guide G.

Thus it is seen that the container of the package 10 in which the photographic plates are shipped constitutes, together with the base 24, a magazine for the supply of photographic plates to the photographic machine. It will be understood that after the magazine is depleted, the container constituted by the tubular member 12 is removed from the guide G and is replaced by the container of another package of plates, and that said last mentioned container is first opened by the cord 28 which acts to free the enclosure 16 therefrom so that the latter can be removed after which the container of photographic plates is connected to the base and supported on the upper edge 26 thereof while the temporary cover plate 54 is in position under the open bottom of the base for covering the latter to prevent the passage of light into the container from the bottom of the base. Then the base 24 carrying the new container of photographic plates is mounted on the guide G of the photographic machine in the manner illustrated in Fig. 6, the temporary cover plate 54 being removed progressively from the base as the latter is slid into the guide between rails 48 and 50. It will be understood that the bottom of the guide G is closed against the passage of light as illustrated in Fig. 7.

While I have shown and described several forms of the present invention, it will be understood that the latter may be embodied otherwise than as here shown and that in the illustrated forms of the invention, certain changes in the details of construction and in the arrangement of parts may be made. Accordingly, I do not wish to be limited to the invention as herein shown or described except as may be required by the scope of the appended claims.

Having thus described my invention, what I claim and desire to secure by Letters Patent is:

1. A magazine for supplying photographic plates in a photographic machine, said magazine comprising a container for holding said plates in stacked relation therein, and a base on which said container is mounted in removable relation, said base being open at its opposite ends for the passage of the photographic plates from said container to said base and from said base outwardly thereof, and a temporary closure removably carried by said base for closing the outlet end of said base preliminary to mounting the same in the photographic machine.

2. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, and adjustable means for releasably securing said container to said base.

3. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, and means on said container releasably engageable with the upper edge of the base for removably supporting said container on said base.

4. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, means on said container near but spaced from one end thereof and engageable with the upper edge of the base for removably supporting said container and for positioning said container in relation to said base, and means on said base releasably engageable with said first mentioned means for releasably securing said container in said relation to said base.

5. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, one of said open ends of the base being closed by said container when the latter is mounted on the base, and a temporary closure for the other open end of the base carried thereby.

6. A magazine for supplying photographic plates in a photographic machine, said magazine comprising a container for holding said plates in stacked relation therein, said container having a fixed closure at one end thereof and a removable closure at the other end thereof, a base on which said container is adapted to be mounted in removable relation when said removable closure of said container is removed therefrom, said base being open at its opposite ends for the passage of the photographic plates from said container to said base and from said base outwardly thereof, and means for temporarily supporting said plates in said stacked relation when said removable closure of the container is removed, said temporary supporting means being removable when the container is mounted on said base.

7. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, said container having a fixed upper closure, and means in said container for temporarily supporting the plates in said stacked relation, said temporary supporting means being removable while the container is mounted on said base.

8. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, means in said container for temporarily supporting the plates in said stacked relation, said temporary supporting means being removable while the container is mounted on said base, the upper end of the container having a fixed closure, one of said open ends of the base being closed by said container when the latter is mounted on the base whereby the magazine is closed at its upper end, and a temporary closure for the lower end of the magazine removable therefrom when said container is mounted on said base.

9. A package of photographic plates constructed and arranged to be mounted on a base in a photographic machine to form with said base a magazine for supplying the photographic plates to the machine, said package comprising a light-proof container having a body portion in which said plates are positioned in stacked relation, a removable closure for one end of said body portion of the container, and means in said container for temporarily holding said plates in said stacked relation in the container when said closure is removed preliminary to mounting said container of plates on said base.

10. A package of photographic plates constructed and arranged to be mounted on a base in a photographic machine to form with said base a magazine for supplying the photographic plates to the machine, said package comprising a light-proof container having a body portion in which said plates are positioned in stacked relation, a removable closure for one end of said body portion of the container, and means for releasably securing said closure to said body portion comprising a fastening strip secured to said closure and to said body portion and a cord for tearing said strip whereby to free the closure from securement to said body portion so that the closure can be removed, said cord constituting means to support the plates in said container when said closure is removed preliminary to mounting said container of plates on said base.

11. A package of photographic plates comprising a light-proof container having a body portion in which said plates are positioned in stacked relation, a removable closure for one end of said body portion of the container, a fixed closure at the other end of said body portion, and means in said container for temporarily holding said plates in said stacked relation in the container when said first mentioned closure is removed.

12. A package of photographic plates comprising a light-proof container having a body portion in which said plates are positioned in stacked relation, a removable closure for one end of said body portion of the container, and means for releasably securing said closure to said body portion comprising a fastening strip secured to said closure and to said body portion and a cord for tearing said strip whereby to free the closure from securement to said body portion so that the closure can be removed, said cord constituting means to support the plates in said container when said closure is removed.

13. A package of photographic plates constructed and arranged to be mounted on a base in a photographic machine to form with said base a magazine for supplying the photographic plates to the machine, said package comprising a non-metallic light-proof container having a body portion in which said plates are positioned in stacked relation, a removable closure for one end of said body portion of the container, a shoulder formed on said body portion engageable with said base, when said closure is removed, for supporting the container on the base, and means in said container for temporarily holding said plates in said stacked relation in the container when said closure is removed preliminary to mounting said container on the base.

14. A package of photographic plates constructed and arranged to be mounted on a base in a photographic machine to form with said base a magazine for supplying the photographic plates to the machine, said package comprising a non-metallic light-proof container having a body portion in which said plates are positioned in stacked relation, a removable closure for one end of said body portion of the container, a shoulder formed on said body portion engageable with said base, when said closure is removed, for supporting the container on the base, and means for releasably securing said closure to said body portion comprising a fastening strip secured to said closure and to said body portion and a cord for tearing said strip whereby to free the closure from securement to said body portion so that the closure can be removed, said cord constituting means to support the plates in said container when said closure is removed preliminary to mounting said container on the base.

15. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, means on said container forming lower and upper external shoulders thereon, said lower shoulder being engageable with the upper edge of the base for supporting said container thereon, and means on said base releasably engageable with said upper shoulder for releasably securing said container to the base.

16. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, means on said container forming lower and upper external shoulders thereon, said lower shoulder being engageable with the upper edge of the base for supporting said container thereon, and resilient means on said base releasably engageable with said upper shoulder for releasably securing said container to the base.

17. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, means on said container forming lower and upper external shoulders thereon, said lower shoulder being engageable with the upper edge of the base for supporting said container thereon, and means on said base releasably engageable with said upper shoulder for releasably securing said container to the base, said last mentioned means comprising members adjustably secured to said base at the opposite sides thereof.

18. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, and means for releasably securing said container to said base, said last mentioned means comprising an adjustable strap secured to said base and removably engageable with said container.

19. A magazine for supplying photographic plates in a photographic machine, said magazine comprising a container for holding said plates in stacked relation therein, a base on which said container is mounted in removable relation, said base being open at its opposite ends for the passage of the photographic plates from said container to said base and from said base outwardly thereof, internal ledges on said base for supporting said container therein, and a temporary closure removably engageable with said base for temporarily closing the same preliminary to mounting the magazine in the photographic machine.

20. A magazine for supplying photographic plates in a photographic machine, said magazine comprising a base adapted to support a container of the photographic plates, said base having internal ledges adapted to be engaged by the lower edge of said container above the lower open end of the base, and a temporary closure removably carried by said base for closing the outlet end of said base preliminary to mounting the same in the photographic machine.

WILLIAM RABKIN.